United States Patent
Patberg et al.

(10) Patent No.: US 10,001,111 B2
(45) Date of Patent: Jun. 19, 2018

(54) TRANSITION BODY BETWEEN TOWER SECTIONS OF A WIND TURBINE AND WIND TURBINE TOWER COMPRISING SAME

(71) Applicant: THYSSENKRUPP STEEL EUROPE AG, Duisburg (DE)

(72) Inventors: Lothar Patberg, Moers (DE); Stephan Drewes, Mönchengladbach (DE); Adrian Paton, Dinslaken (DE); Konstantinos Savvas, Düsseldorf (DE); Mark Hirt, Bochum (DE); Maik Bogatsch, Duisburg (DE)

(73) Assignee: THYSSENKRUPP STEEL EUROPE AG, Duisburg (DE)

( * ) Notice: Subject to any disclaimer, the term of this patent is extended or adjusted under 35 U.S.C. 154(b) by 0 days. days.

(21) Appl. No.: 15/022,412

(22) PCT Filed: Aug. 28, 2014

(86) PCT No.: PCT/EP2014/068307
§ 371 (c)(1),
(2) Date: Mar. 16, 2016

(87) PCT Pub. No.: WO2015/039852
PCT Pub. Date: Mar. 26, 2015

(65) Prior Publication Data
US 2016/0230745 A1 Aug. 11, 2016

(30) Foreign Application Priority Data
Sep. 23, 2013 (DE) .................. 10 2013 110 495

(51) Int. Cl.
*E04H 12/00* (2006.01)
*F03D 13/20* (2016.01)
(Continued)

(52) U.S. Cl.
CPC .......... *F03D 13/22* (2016.05); *E02B 17/0004* (2013.01); *E04H 12/085* (2013.01);
(Continued)

(58) Field of Classification Search
CPC ........ F03D 13/22; F03D 1/0666; F03D 80/82; F03D 15/00; F03D 9/002; F03D 13/10;
(Continued)

(56) References Cited

U.S. PATENT DOCUMENTS 3,024,774 A * 3/1962 Eby, Jr. ............ F02M 35/10072
                                                                                  123/184.39
4,687,380 A * 8/1987 Meek .................... E02B 17/027
                                                                                     405/203
(Continued)

FOREIGN PATENT DOCUMENTS

| CN | 101016887 A | 8/2007 |
| CN | 101126285 A | 2/2008 |

(Continued)

OTHER PUBLICATIONS

Int'l Search Report for PCT/EP2014/068307 dated Nov. 11, 2014 (mailed Nov. 25, 2014).
(Continued)

*Primary Examiner* — Basil Katcheves
*Assistant Examiner* — Joshua Ihezie
(74) *Attorney, Agent, or Firm* — Thyssenkrupp North America, Inc.

(57) ABSTRACT

A transition body may be disposed between upper and lower tower sections of a tower for a wind power station. Some example transition bodies may include a substantially annular upper connection flange for connection to the upper tower section, and at least three substantially annular lower connection flanges, each of which may connect to a corner leg of the lower tower section. The transition body may have (Continued)

several segments disposed about a central tower axis, with the number of segments corresponding to the number of corner legs. Upper peripheral sections of the segments may form an annular circumferential connection envelope that supports the upper connection flange. Lower sections of the segments may form annular circumferential segment envelopes that support the lower connection flanges. The segments may be disposed at acute angles and converge into one another at or near the upper connection flange.

14 Claims, 8 Drawing Sheets

(51) Int. Cl.
| | | |
|---|---|---|
| *E02B 17/00* | (2006.01) | |
| *E04H 12/08* | (2006.01) | |
| *E04H 12/10* | (2006.01) | |
| *F03D 13/10* | (2016.01) | |
| *F03D 15/00* | (2016.01) | |
| *F03D 80/80* | (2016.01) | |
| *E04H 12/34* | (2006.01) | |
| *F03D 1/06* | (2006.01) | |
| *F03D 9/25* | (2016.01) | |

(52) U.S. Cl.
CPC .............. *E04H 12/10* (2013.01); *E04H 12/34* (2013.01); *F03D 1/0666* (2013.01); *F03D 9/25* (2016.05); *F03D 13/10* (2016.05); *F03D 15/00* (2016.05); *F03D 80/82* (2016.05); *E02B 2017/0091* (2013.01); *E04H 2012/006* (2013.01); *F05B 2230/232* (2013.01); *F05B 2240/9121* (2013.01); *Y02E 10/721* (2013.01); *Y02E 10/728* (2013.01); *Y02P 70/523* (2015.11)

(58) Field of Classification Search
CPC ....... E04H 12/34; E04H 12/085; E04H 12/10; E04H 2012/006; E02B 17/0004; E02B 2017/0091; Y02E 10/728; Y02P 70/523; F05B 2240/9121; F05B 2230/232
See application file for complete search history.

(56) References Cited

U.S. PATENT DOCUMENTS

| | | | | |
|---|---|---|---|---|
| 4,694,630 A * | 9/1987 | McGinnis | ............... | E04H 12/10 |
| | | | | 52/648.1 |
| 6,027,146 A * | 2/2000 | Kurimoto | ............... | F01N 13/08 |
| | | | | 285/131.1 |
| 7,276,808 B2 * | 10/2007 | Weitkamp | ............... | E02D 27/42 |
| | | | | 290/44 |
| 7,735,290 B2 * | 6/2010 | Arsene | ................... | F03D 1/001 |
| | | | | 248/127 |
| 7,993,107 B2 * | 8/2011 | Gevers | ................... | F03D 1/001 |
| | | | | 248/163.1 |
| 8,196,703 B2 * | 6/2012 | Stanley | ................... | F01N 1/003 |
| | | | | 181/212 |
| 8,474,252 B2 * | 7/2013 | Butler | ..................... | F01N 13/08 |
| | | | | 60/305 |
| 8,544,214 B2 * | 10/2013 | Bagepalli | ................ | E02D 27/42 |
| | | | | 248/163.1 |
| 2006/0267348 A1 * | 11/2006 | Weitkamp | ............... | E02D 27/42 |
| | | | | 290/55 |
| 2008/0028715 A1 * | 2/2008 | Foss | ........................ | F03D 13/22 |
| | | | | 52/651.01 |
| 2011/0138721 A1 * | 6/2011 | Bagepalli | ................ | E02D 27/42 |
| | | | | 52/299 |
| 2011/0154812 A1 * | 6/2011 | Butler | ..................... | F01N 13/08 |
| | | | | 60/324 |
| 2011/0314750 A1 | 12/2011 | Nies | | |
| 2014/0147272 A1 * | 5/2014 | Donescu | ................. | F03D 1/003 |
| | | | | 416/1 |
| 2014/0345218 A1 * | 11/2014 | Larsen | ..................... | F03D 13/25 |
| | | | | 52/299 |
| 2015/0152664 A1 * | 6/2015 | Larsen | .................. | B21C 37/296 |
| | | | | 52/651.07 |
| 2015/0354203 A1 * | 12/2015 | Drewes | ..................... | E04B 1/40 |
| | | | | 52/651.01 |

FOREIGN PATENT DOCUMENTS

| | | |
|---|---|---|
| CN | 101970776 A | 2/2011 |
| DE | 10339438 A1 | 4/2005 |
| DE | 102006056274 A1 | 5/2008 |
| DE | 60317372 T2 | 8/2008 |
| EP | 2072685 A1 | 6/2009 |
| EP | 2333163 A1 | 6/2011 |
| EP | 2 592 199 A1 | 5/2013 |
| EP | 2597227 A1 | 5/2013 |
| WO | 2005040605 A1 | 5/2005 |
| WO | 2009048955 A1 | 4/2009 |
| WO | 2012130245 A2 | 10/2012 |
| WO | 2013092626 A1 | 6/2013 |

OTHER PUBLICATIONS

English Language Abstract for DE60317372.
English Language Abstract for WO2009048955.
English Language Abstract for DE102006056274.
English Language Abstract for DE10339438.
English Language Abstract for WO2013092626.

* cited by examiner

TRANSITION BODY BETWEEN TOWER SECTIONS OF A WIND TURBINE AND WIND TURBINE TOWER COMPRISING SAME

CROSS REFERENCE TO RELATED APPLICATIONS

This application is a U.S. National Stage Entry of International Patent Application Serial Number PCT/EP2014/068307, filed Aug. 28, 2014, which claims priority to German Patent Application No. DE 102013110495.9 filed Sep. 23, 2013, the entire contents of both of which are incorporated herein by reference.

FIELD

The present disclosure relates to wind turbines and, more particularly, to tower sections for wind turbines.

BACKGROUND

In order to improve the efficiency of wind power stations, the hubs are being arranged at ever increasing heights and larger rotors and more powerful generators are being used. This requires tower segments with increasingly larger diameters and greater wall thicknesses, so that the towers of wind power stations have sufficient rigidity, buckling resistance, and fatigue strength. Already prefabricated tubular tower segments whose diameter significantly exceeds a certain value, such as 4.4 m, can only be transported with tremendous expense to the installation site of the wind power station. This is especially due to the width of the available roads for the transport and to the clearance heights of the bridges along the way. But even transport by waterways is extremely costly in the case of large tower segments.

One possible approach to a solution, which is proposed for example in DE 603 17 372 T2 and also in WO 2009/048955 A1, is the so-called lengthwise oriented construction, which is employed especially in the lower region of the tower. Here, arc-shaped tower sections are transported to the construction site and then assembled there into tubular tower segments. The connection of the arc-shaped tower sections can be done by screw fasteners with corresponding flanges. However, the drawback of the lengthwise oriented construction is that the arc-shaped tower sections can become deformed during transport, which can greatly impede if not prevent the assembly on site. Furthermore, the assembly expense is significantly increased.

Moreover, wind power stations are known in which the rotor and the generator are mounted on a framework tower. This construction has proven to work especially in the case of small and low-height stations. For larger and taller stations, the assembly expense is disproportionately large, since the assembly of the individual pieces of the framework must almost always be done on site and thus a time and cost saving prefabrication is hardly possible.

From DE 10 2006 056 274 A1 there is known a tower of a wind power station which is configured as a latticework tower (framework tower) in the lower region with at least three corner legs and as a tubular tower in the upper region with round cross sections. The upper tower section and the lower tower section are joined to each other by a transition body. The transition body is fashioned in the form of a truncated cone envelope, while the respective corner leg extends into the transition body and is joined there by two lengthwise welds to the outside of the truncated cone envelope.

From DE 103 39 438 A1 there is known a tower for a wind power station, which is likewise formed from a lower tower section in the form of a latticework tower and an upper tower section in the form of a tubular tower. Between these two tower sections is provided a transition body, which joins the lower tower section to the upper tower section. A comparable tower of a wind power station is described in WO 2013/092626 A1.

The aforementioned hybrid towers for wind power stations with a so-called disconnected tower structure, having a lower tower section of framework construction and an upper tower section in the form of tubing, have the drawback that the transition body between the upper and the lower tower section requires an increased assembly expense and does not allow an optimal flow of force.

Therefore, a need exists for improvements to the transition bodies and towers of at least each of the aforementioned and specified kinds of towers for wind turbines so as to lower assembly expenses and improve the flow of forces without causing a disproportionate increase in transportation expenses.

DETAILED DESCRIPTION

Figure 1:
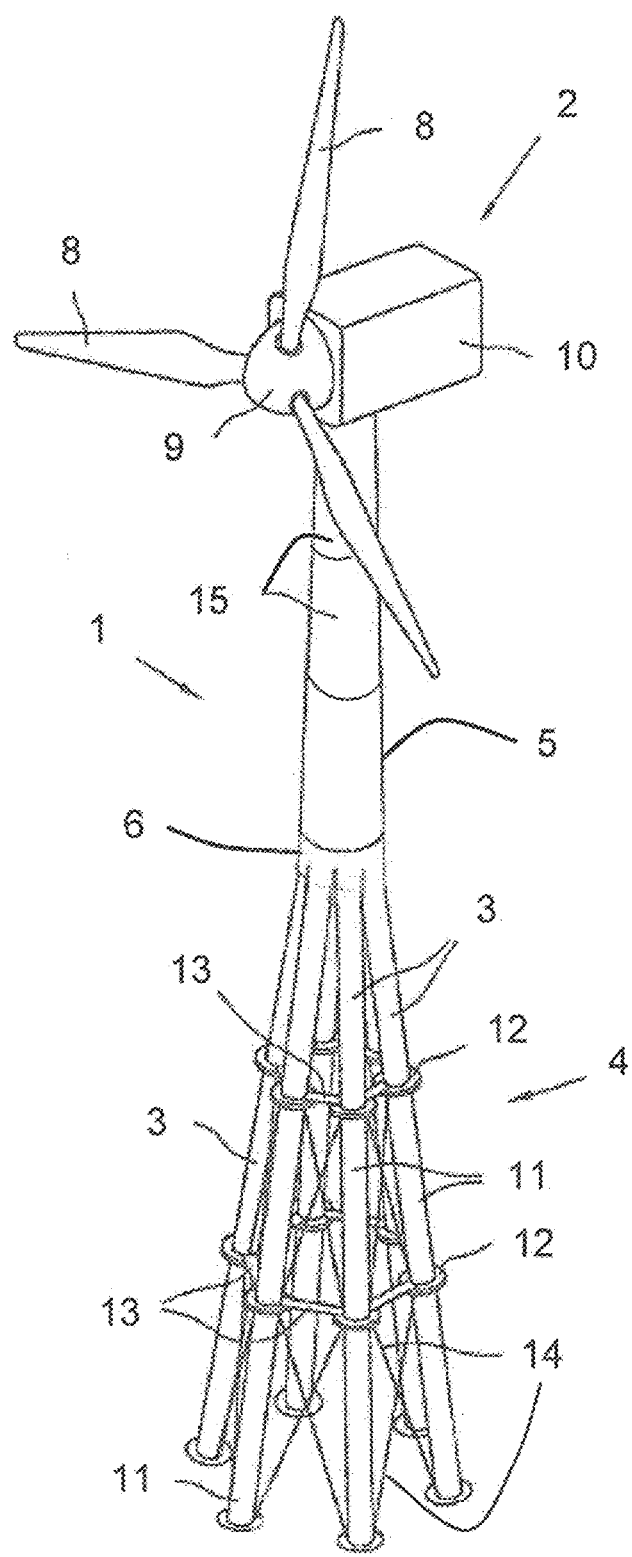
FIG. 1 is a perspective view of an example tower of a wind power station having an example transition body.

Although certain example methods and apparatus have been described herein, the scope of coverage of this patent is not limited thereto. On the contrary, this patent covers all methods, apparatus, and articles of manufacture fairly falling within the scope of the appended claims either literally or under the doctrine of equivalents.

In some examples, a transition body may be positioned between an upper tower section and a lower tower section of a tower for a wind power station. In some examples, an essentially-annular upper connection flange may join the transition body to an upper tower section, and at least three essentially-annular lower connection flanges may be joined to corner legs of the lower tower section. The transition body may in some cases have several segments arranged about a central tower axis, wherein a number of segments may correspond to a number of corner legs. Upper sections of the segments on the outside of the transition body may form an annular circumferential connection envelope bearing the upper connection flange, and lower sections of the segments may each form annular circumferential segment envelopes bearing a lower connection flange. Likewise, example towers for wind power stations may have an upper tower section in the form of a tubular tower, a lower tower section having at least three corner legs, and a transition body joining the upper tower section to the lower tower section.

Thus, according to the invention, a transition body is provided as a transition between an upper tower section and a lower tower section in order in this way to provide a tower for a wind power station. For the connection of the transition body, there is provided an upper connection flange, which is shaped as a ring. Preferably, the upper connection flange is shaped as a circle, in order to be joined to a likewise shaped flange of a tubular tower. Therefore, the tubular tower preferably has a circular cross section, especially one of uniform size, which improves the stability of the tower under wind loading. In principle, the upper connection flange could also be oval or polygonal in shape, although this is basically less preferable. In order to avoid welding work at great height, it is preferable for the upper connection flange to be provided for bolting to a connection flange of the upper tower section.

The lower tower section preferably constitutes a disconnected tower structure according to the invention, comprising several legs in the form of corner legs. In order to ensure an adequate upright stability, at least three corner legs are provided. But it is also possible to provide preferably at least four corner legs in order to further improve the upright stability. A good compromise between upright stability and assembly expense can be achieved in particular with five or six corner legs. Consequently, the transition body has at least three connection flanges, each of which can be connected to a corner leg. While the upper tower section is preferably oriented parallel to the central tower axis, the corner legs are preferably slightly slanted to the outside for better force diversion and consequently make an acute angle with the central tower axis. Furthermore, it is preferable to arrange the corner legs about the central tower axis, preferably in uniform fashion. Thus, for example, a wind load can be equally well diverted on all sides.

A design simplification is achieved in that the transition body has segments distributed around the central tower axis, the number of segments corresponding to the number of corner legs.

Thus, the forces diverted from the upper tower section can be distributed via the segments to the corner legs and diverted across the corner legs. For the purpose of a uniform construction of the tower, the segments can be arranged uniformly about the central tower axis. The upper sections of the segments jointly form, on the outside of the transition body, an annular, preferably closed, circumferential connection envelope. This connection envelope bears the upper connection flange and can therefore divert the forces transmitted from the upper tower section downward in uniform manner.

While the upper sections of the segments pass into one another in the outer region, the segments in the lower region form separate annular circumferential segment envelopes. While the connection envelope preferably has a circular cross section, the segment envelopes preferably deviate from a circular cross-sectional shape at least in sections. At the same time, however, it is preferable that the segment envelopes have round cross sections at their lower ends. The segment envelopes can then divert forces uniformly via the lower connection flanges to corner legs. For the same purpose, the corner legs preferably have equal cross sections, especially also circular cross sections. In order to avoid welding at great height, the lower connection flanges are also configured for bolting to corresponding connection flanges of the corner legs.

The invention has discovered that the segments enable a better flow of force if the segment envelopes pass into one another in the upper region with an acute angle at inwardly pointing sections. In this way, peak stresses are avoided. The inwardly pointing sections can point centrally inward in the direction of the central tower axis. But this is not necessary. The corresponding sections can also point inward in the direction of an adjacent corner leg. Consequently, the outer regions of the segments are brought together in the region of the outer connection envelope and the inner regions of the segments are brought together in the inner region of the transition body, especially in the region of the central tower axis. The corresponding segments have the additional advantage that they can be transported rather easily separately to the place of assembly of the tower on account of their dimensions and be assembled into a transition body there. If need be, this can be done by welding. The welding can take place on the ground and only after the welding of the segments to each other the transition body can be lifted onto the lower tower section. Furthermore, the providing of the upper connection flange and the lower connection flange results in a quite simple assembly of the transition body between the lower tower section and the upper tower section of the tower of a wind power station.

In some example transition bodies, the segments are essentially similar in configuration. In this way, the prefabrication of the segments and their assembly can be facilitated. This is especially the case when the segments are essentially structurally identical. It is then possible to use identical parts to a large extent and one avoids mistakes during the assembly process. Those having ordinary skill in the art will understand that the words 'essentially' and 'substantially' may be used interchangeably herein.

The segment envelopes of the transition body can pass into one another such that the transition body is closed off at the bottom by the segment envelopes in the region of the central tower axis. This results in a stiffening of the transition body and furthermore allows a more uniform diversion of forces which are acting upon the tower for wind power stations.

Alternatively or additionally, the segment envelopes can pass into one another such that the transitions of the segment envelopes form a starlike structure. This starlike structure preferably starts from the central tower axis, and further preferably the central tower axis passes through the centre of the starlike structure. In any case, the starlike structure results in a stiffening of the transition body. The segments can form connection ribs along the starlike structure, by which the segments are braced against each other, especially when a lateral load, such as a wind load, is acting on the tower. At the same time, the starlike structure can result in a more uniform diverting of forces in order to lessen the peak stresses in the structure of the transition body. Basically, the starlike structure can be arranged roughly at the height of the upper connection flange or also underneath it. Preferably, however, the starlike structure is provided above the lower connection flange, especially significantly above it.

The upper regions of the segments or that of the segment envelopes can have the shape of a circle segment, especially in a plane transverse to the central tower axis, i.e., in a horizontal plane. In other words, the upper regions of the segments or that of the segment envelopes can be configured like slices of a pie. The circle segments each preferably have an aperture angle which basically add up to 360° and also preferably are each of the same size. The resulting symmetry likewise leads to a further stiffening of the transition body as well as a more uniform flow of force.

In order for the segments to pass into one another in the upper region both in the inner region of the transition body and in the outer region of the transition body and form separate segment envelopes in the lower region, it is advisable for the shape of the cross sections of the segment envelopes to change steadily, at least in an upper region, along the lengthwise dimension of the segment envelopes. In this way, peak stresses are avoided and the danger of a local material failure, especially a buckling, is decreased. If need be, the cross-sectional area of the cross sections can also change steadily when this is advisable on account of the cross sections of the corner legs, in order to avoid a nonconstant cross-sectional transition from the segments to the corner legs. Such a lack of constancy might mean an increased need for material at the sides of the transition body or at the side of the corner legs.

In particular, it will be preferable for the segment envelopes to taper toward the bottom. In other words, the cross-sectional area of the segment envelopes will decrease toward the bottom. This makes possible a material-sparing use of corner legs with less wall thickness and/or cross-sectional area, i.e., diameter, when the cross sections of the corner legs are circular, which is preferred for reasons of stiffness of the corner legs.

The stiffness of the tower as a whole can alternatively or additionally be increased in that the upper connection flange and/or the lower connection flange are circular in shape.

In order to simplify the assembly and the maintenance, the upper connection flange and/or the lower connection flange can be arranged on the inside. Inside means in particular inside with respect to the segment envelopes in the case of the lower connection flange or inside in regard to the connection envelope in the case of the upper connection flange. In both cases, the respective flange runs entirely around the circumference in regard to the respective envelope, since this likewise leads to a more stiff and stable connection.

The fabrication of the upper body can be done especially easily in that the segment envelopes, preferably the segments, are formed by essentially lengthwise welded steel plates. The flange could preferably be formed by separate structural elements. Thanks to the welding of steel plates, even complex shapes can be easily fabricated. In this context, it is especially advisable for the steel plates to be curved triangular and/or trapezoidal steel plates. In this way, the fabrication of the transition body can be further simplified.

Alternatively, the segment envelopes can be joined together by lateral connection plates and/or a lower connection plate arranged essentially transversely to the central tower axis. The lower connection plate is thus preferably horizontally oriented in the state when joined to the tower sections. The connection plate or the connection plates can serve to further stiffen the transition body. In particular, when the transition body has an especially jagged configuration, one can in this way ensure that less surface of attack is presented to the wind and the transition body presents altogether less flow resistance to the wind.

As regards the tower, in a first preferred embodiment of the invention the upper tower section is fashioned essentially as a hollow profile. In this way, a high stiffness is achieved with low weight. In particular, the upper tower section is tubular, if need be with upwardly tapering cross section. Alternatively or additionally, for the same reasons, the corner legs can be fashioned essentially as a hollow profile and preferably have a tubular shape whose cross section can taper downwardly if need be.

It is especially preferred for the lower tower section to be configured as a framework tower. This kind of tower section is also called a latticework tower. In this kind of lower tower section the benefits of the invention come to bear in a particular degree. For the further stiffening of the lower tower section, the corner legs can be joined together by braces. For this purpose, the braces run preferably horizontally and/or diagonally, while horizontal and diagonal braces are especially preferred.

The tower 1 of a wind power station 2 represented in FIG. 1 is constructed from a lower tower section 4 having several corner legs 3, an upper tower section 5 in the form of a round tubular tower in cross section, and a transition body 6 arranged in between. At the upper end of the tubular tower of the upper tower section 5 is mounted a wind power station 2, which is pivotally mounted and able to turn about an essentially vertically running axis. The wind power station 2 comprises a rotor 7 with three rotor blades 8, which can turn about a horizontal axis. Furthermore, the rotor blades 8 are mounted on the hub 9 of the wind power station 2 so as to turn about their lengthwise dimension and thus be pitched essentially continuously against the wind. In the so-called nacelle housing 10 is arranged a generator, whose shaft is connected to the rotor 7, rigid to rotation, by a gearing and a coupling.

The lower tower section 4 has in the depicted and accordingly preferred tower 1 six corner legs 3, while more or fewer than six corner legs 3 would also be possible. But the tower 1 has at least three corner legs 3, whose horizontal distance from each other decreases toward the bottom, starting at the transition body 6. The preferably essentially straight corner legs 3 thus form a three or more legged tower structure, whose legs are spread apart at an acute angle to each other. The lower tower section 4 can also be called a disconnected tower structure. Each corner leg 3 of the represented and accordingly preferred tower 1 is assembled from several, in the present case three, steel pipe profiles 11 joined together in the lengthwise direction, and thus is itself tubular. The connection sites of the steel pipe profiles 11 are formed by perforated screw-fastened flanges 12, which can be configured as a ring flange.

Preferably the steel pipe profiles 11 used for the corner legs 3 are lengthwise welded or spiral welded. The steel pipe profiles 11 of the corner legs 3 preferably have a wall thickness in the range of 5 mm to 30 mm, while the diameter is preferably between 500 mm and 1900 mm.

In the represented and accordingly preferred tower 1, the corner legs 3 are joined to each other by horizontal braces 13 and diagonal braces 14. The horizontal braces 13 and diagonal braces 14 are formed from identical steel profiles, which have a U-shaped, L-shaped or T-shaped cross section, for example. Thus, the lower tower section 4 has a modular construction making use of identical parts as much as possible.

The upper tower section 5 has a row of annular and conically tapering toward the top tower segments 15, which are screwed together. The tower segments 15 are essentially fashioned as hollow profiles and form a tube. In the tube, however, there are provided installations such as intermediate floors, ladders and/or stairways, so that a person can ascend the tower 1. The upper tower section 5 is connected by the transition body 6 in the sense of an adapter to the lower tower section 4, especially the corner legs 3 of the lower tower section 4.

Figure 2:
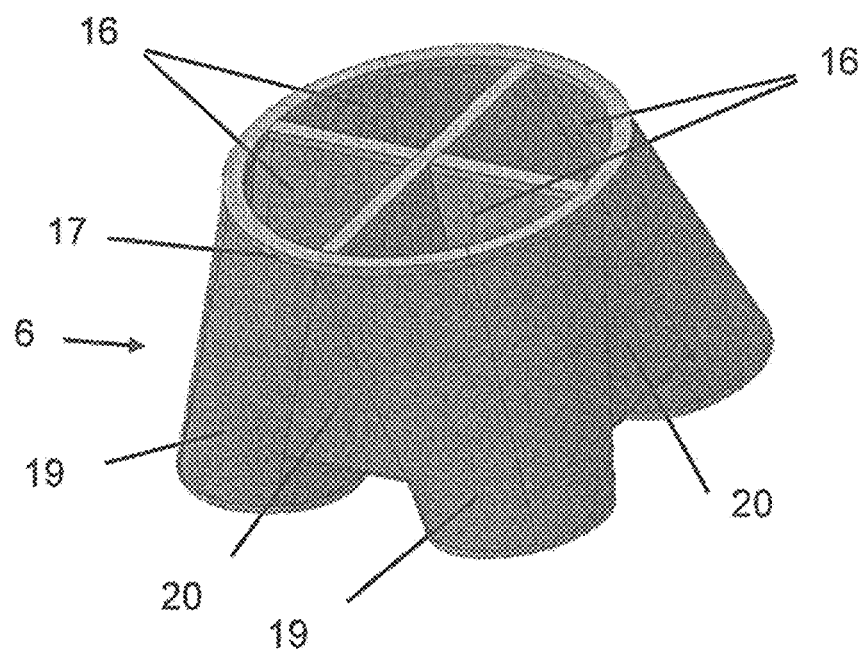
FIG. 2 is a perspective view of an example transition body, shown from above.
Figure 3:
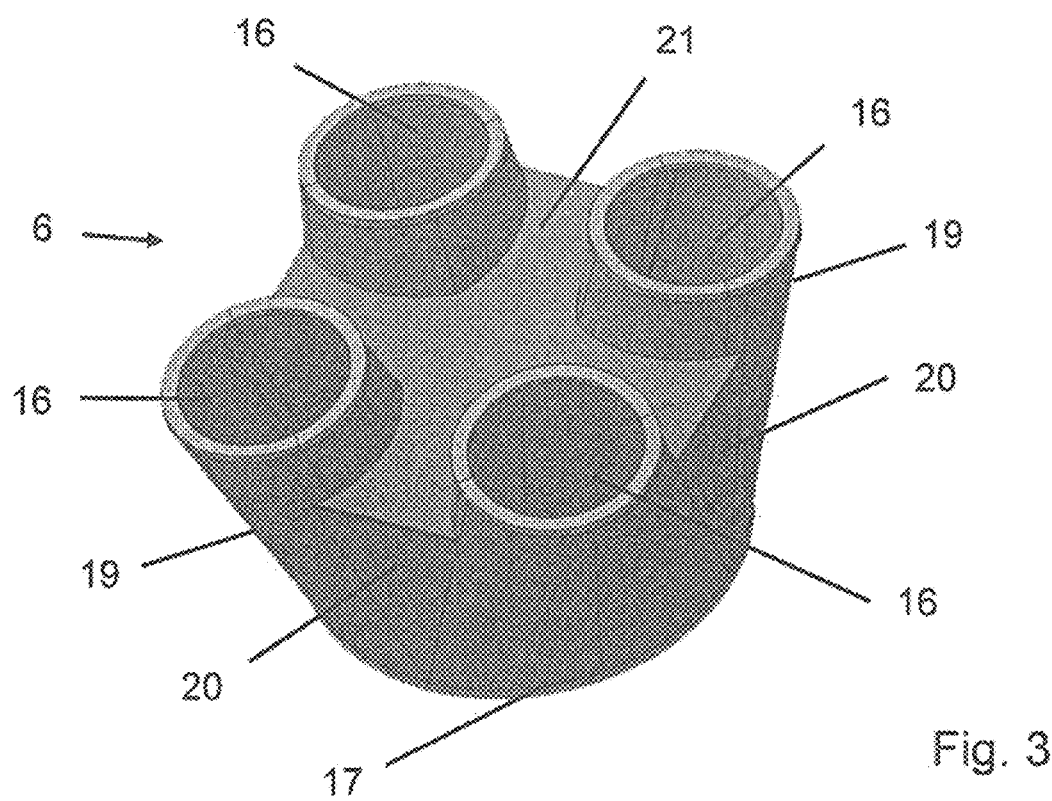
FIG. 3 is a perspective view of the example transition body of FIG. 2, shown from below.

A transition body 6, which is provided for the connection to a lower tower section 4 comprising four corner legs 3 and to an upper tower section 5 in the form of a tubular tower with circular cross section, is shown more closely in FIGS. 2 and 3. For better visibility, the connection flanges by which the transition body 6 is screwed to the upper tower section 5 and the corner legs 3 of the lower tower section 4 have been omitted here. The connection flanges are fashioned as perforated ring flanges and provided on the inside in relation to the respective opening and/or the transition body 6. The connection flanges can therefore be screwed from the inside of the transition body 6 to the adjoining connection flanges of the upper tower section 5 and the lower tower section 4.

The transition body 6 comprises four identical segments 16, which pass into one another in the upper region of the transition body 6. The outer regions of the segments 16 pass into one another to form an annular connection envelope 17. This connection envelope 17 carries at its upper end the connection flange not shown in FIGS. 2 and 3 for screwing the transition body 6 to the upper tower section 5. The inner elements of the segments 16 likewise pass into one another. The connection sites 18 of the inner regions of the segments 16 form a cross whose midpoint lies essentially on the central tower axis of the tower 1 of the wind power station 2.

The segments 16 of the transition body 6 are uniformly arranged about this central tower axis. Furthermore, the segments 16 have at their upper ends cross sections in the shape of quarter circle segments with an aperture angle of around 90° each. However, the cross sections of the segments change from top to bottom. At the lower ends, the segments 16 essentially have circular cross sections. Here, the segments 16 pass into lower connection flanges, which are likewise circular but not shown. The lower connection flanges are arranged here symmetrically about the central tower axis.

The walls of the represented and accordingly preferred segments 16 are formed by steel plates, which are bent or pressed into corresponding shapes. The steel plates form along the entire lengthwise dimension of the segments an circumferential segment envelope 19. In the represented and accordingly preferred transition body 6, essentially vertically running lateral connection plates 20 are provided at the side between every two adjacent segment envelopes 19. In total, the transition body 6 has four such lateral connection plates 20. Furthermore, there is further provided an essentially horizontally oriented connection plate 21, which on the one hand reaches to the lower edges of the vertical connection plates 20 and on the other hand the inner regions of the segment envelopes 19. The latter are embraced by around half of their circumference by the lower connection plate 21.

Figure 4A:
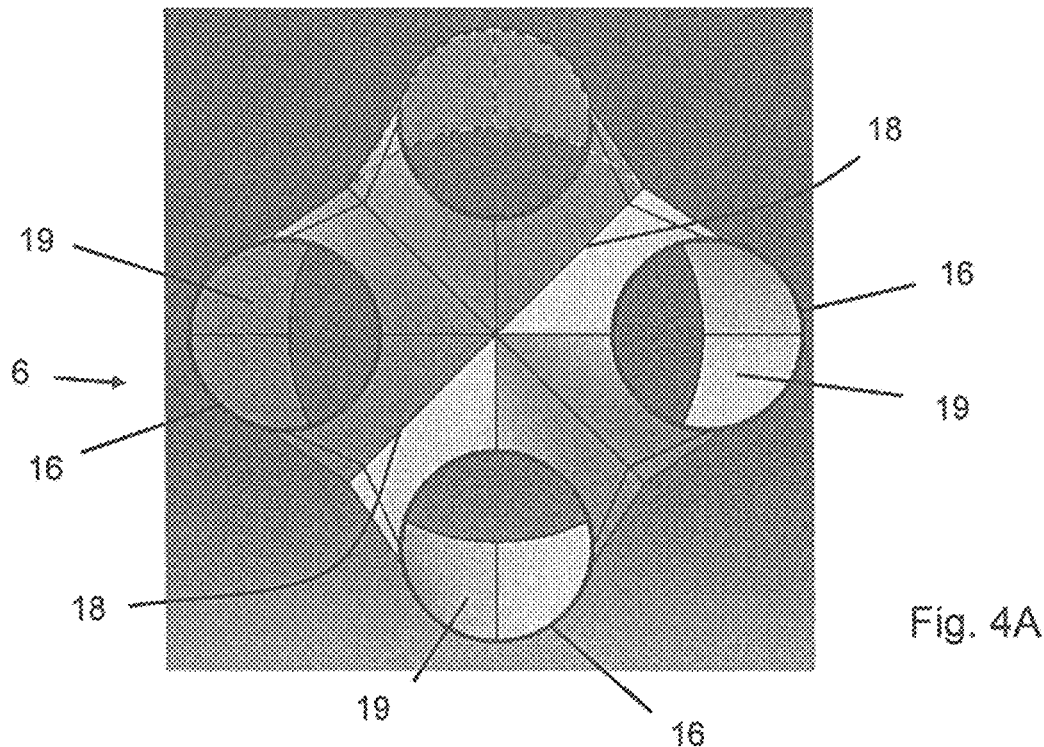
FIG. 4A is a bottom view of the example transition body of FIG. 2.
Figure 4B:
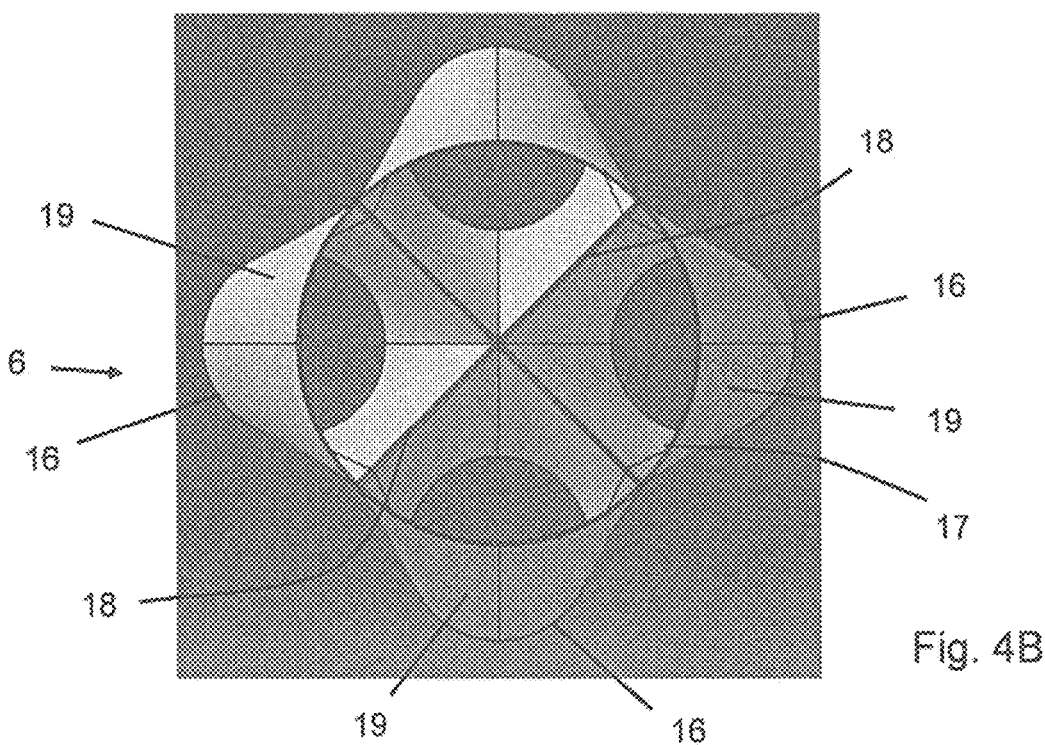
FIG. 4B is a top view of the example transition body of FIG. 2.
Figure 4C:
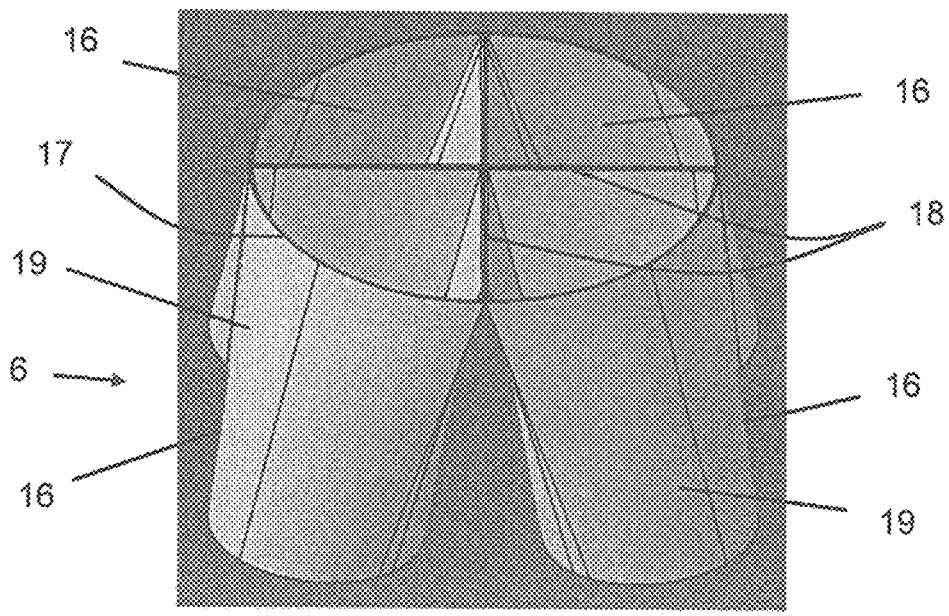
FIG. 4C is another top perspective view of the example transition body of FIG. 2.
Figure 4D:
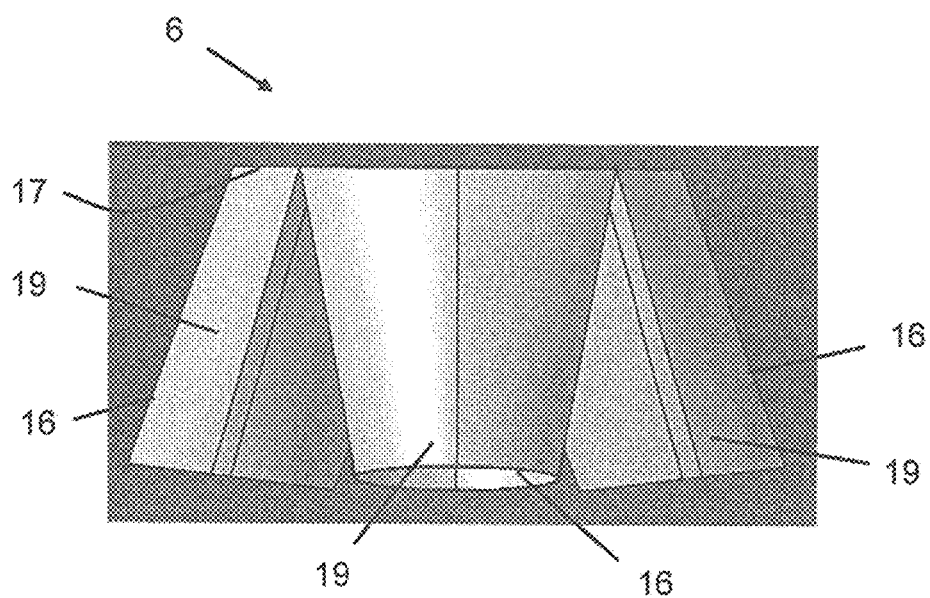
FIG. 4D is a side view of the example transition body of FIG. 2.

For a better understanding of the shape of the transition body 6, refer to FIGS. 4A to 4D. These show the inner construction of the transition body, such as emerges by the connection of the segments 16 via the cross-shaped connection sites 18. All other parts of the transition body 6, such as the connection plates 20, 21 and the connection flanges, have therefore been omitted from FIGS. 4A to 4D. In FIG. 4A, the transition body 6 is represented in a view from below and in FIG. 4B in a view from above. Furthermore, the transition body 6 is represented in FIG. 4C in a perspective view and in FIG. 4D in a side view.

The individual segments 16 have a circular cross section at their lower end. In the direction of the upper end of the segments 16, this cross section changes steadily, until it assumes the shape of a circle segment or a slice of pie. The inner regions of the segments 16 meet at line-shaped connection sites 18, which have a somewhat star-shaped configuration, in the present case somewhat cross-shaped. The centre of the star-shaped or cross-shaped structure formed by the connection sites 18 between the segments 16 is arranged roughly on the central tower axis, preferably the same as the centre of the connection envelope 17. The connection envelope 17 is formed by the outer regions of the segments 16 and is provided encircling the upper end of the transition body 6.

Furthermore, in the transition body 6 represented in FIGS. 2 to 4, the connection flanges not shown are welded to the upper end of the connection envelope 17 and the lower ends of the segments 16. The transition body 6 itself, however, is preferably screwed via the connection flanges to the upper and the lower tower section 4, 5. In the transition body 6 of FIGS. 2 to 4, the circumferential connection envelope 17 of the transition body 6 has a very slight vertical dimension. The height of the connection envelope 17 is essentially limited to the connection of the segments 16 to each other and the connection of the connection envelope 17 to the connection flange. Alternatively, however, the connection envelope 17 could also have greater height, in which case the connection of the inner regions of the segments 16 to the star-shaped or cross-shaped structure can further be provided roughly at the height of the connection envelope 17, especially the upper end of the connection envelope 17, or beneath it. The inner regions of the segments 16, however, should pass into one another above the lower ends of the segments 16.

Figure 5:
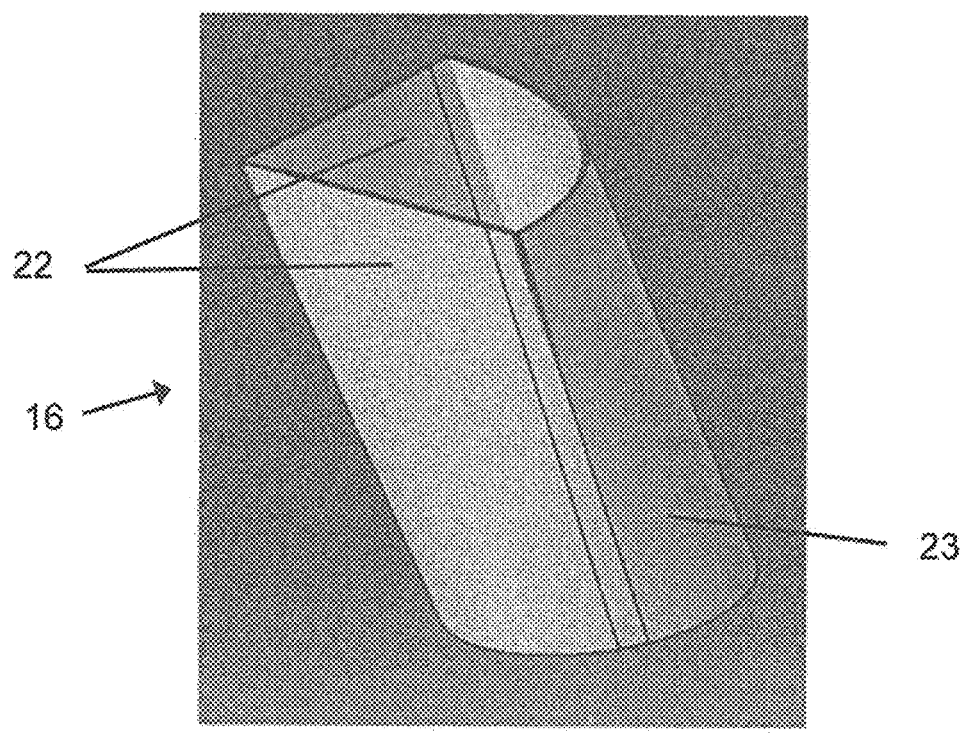
FIG. 5 is a perspective view of a segment of the example transition body of FIG. 2.

The segments 16 are identical in construction and are formed by welding of trapezoidal correspondingly curved plates 22, 23. In this context, refer in particular to FIG. 5, in which an individual segment 16 of the transition body 6 as per FIGS. 2 to 4 is represented. The segment 16 shown is formed altogether by three shaped plates 22, 23 which are welded together. Two of the plates 22 are formed from an essentially identical cut piece of plate and are shaped essentially identical. These plates 22 thus have essentially the same shape. These two plates 22 form the inner region in relation to the transition body 6, while the third plate 23, curved differently from the other plates 22, forms essentially the outer region of the segment 16 in regard to the transition body 6. The segments 16 formed in this way are joined together, likewise by welding.

Figure 6:
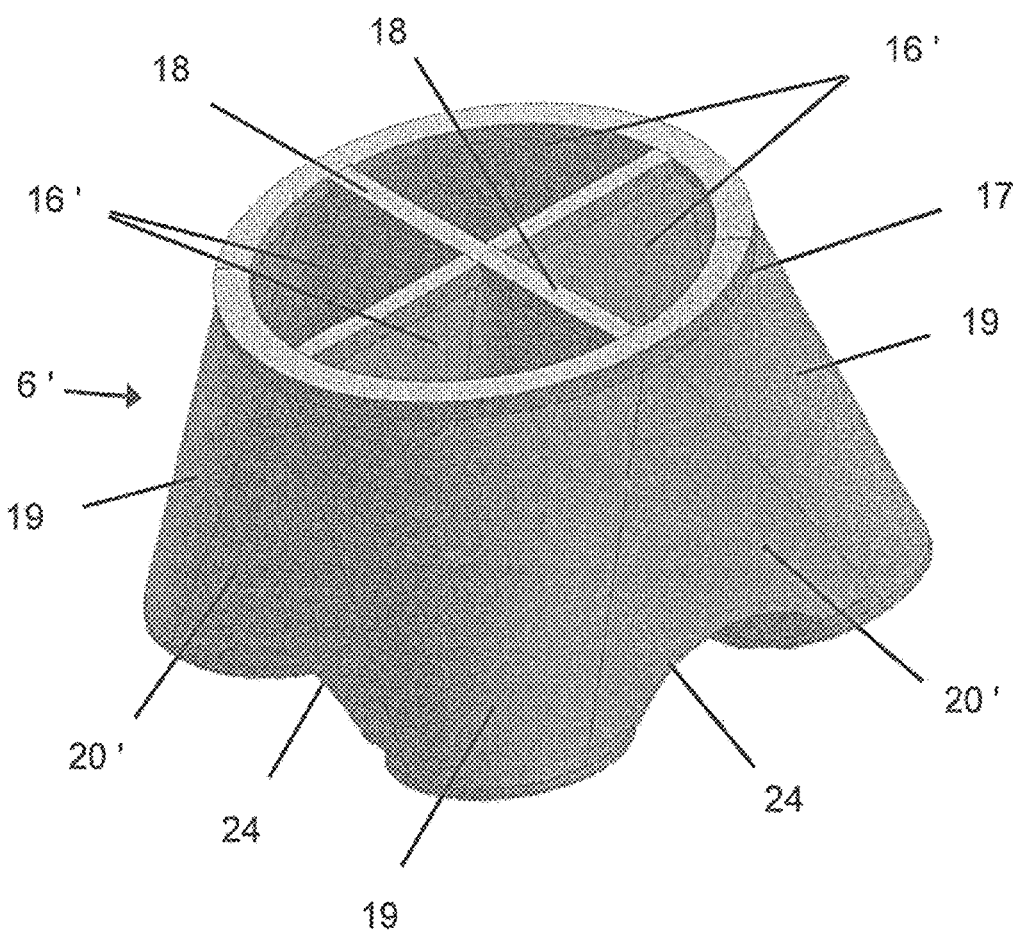
FIG. 6 is a perspective view of an example transition body, shown from above.
Figure 7:
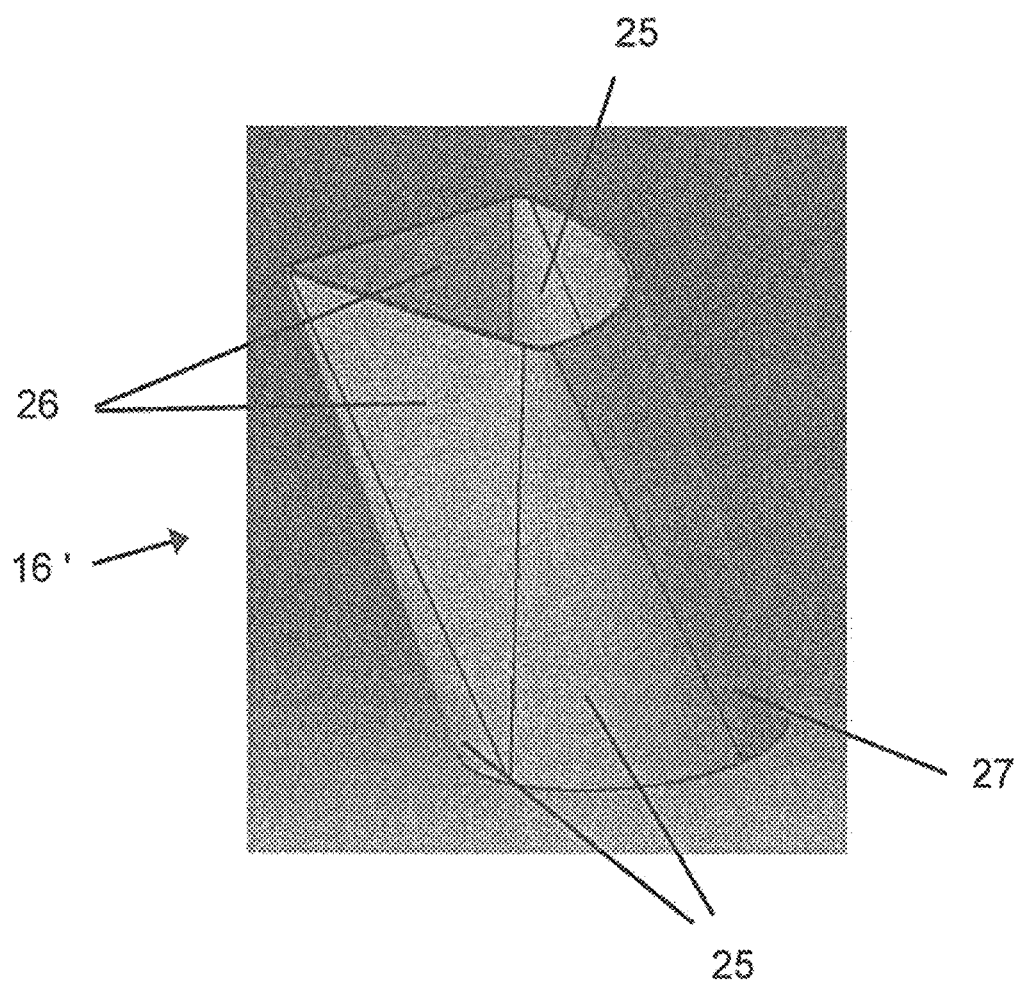
FIG. 7 is a perspective view of a segment of the example transition body of FIG. 6.

An alternative configuration of the transition body 6' is shown in FIG. 6. The corresponding transition body 6' in its basic construction resembles the transition body 6 of FIGS. 2 to 5, so that in what follows we shall only go into the differences of the transition body 6, 6'. In the transition body 6' of FIG. 6, lateral connection plates 20' are provided between every two segments 16', being oriented for the most part vertically. These connection plates 20' are furthermore provided roughly flush with the outside of the transition body 6'. The represented and accordingly preferred lateral connection plates 20' have a curved recess 24 at their lower edge. There is no essentially horizontally oriented connection plate in the transition body 6' of FIG. 6.

A further distinction of the transition body 6' of FIG. 6 as compared to the transition body 6 of FIGS. 2 to 4 is the fabrication and configuration of the individual segments 16'. These are obtained by welding of essentially five triangular plates 25, 26 and one trapezoidal plate 27. The triangular plates 25, 26 can be obtained from an essentially identical cut piece of sheet metal, the plates 25, 26 being shaped in two different ways in order to obtain the desired curved shape. Three of the plates 25 after the shaping have essentially the same shape, while the other two triangular plates 26 likewise have essentially the same shape. The trapezoidal plate 27 likewise shaped from a flat cut piece of sheet metal forms the greater portion of the outwardly pointing side of the segment 16' in the transition body 6'.

Figure 8:
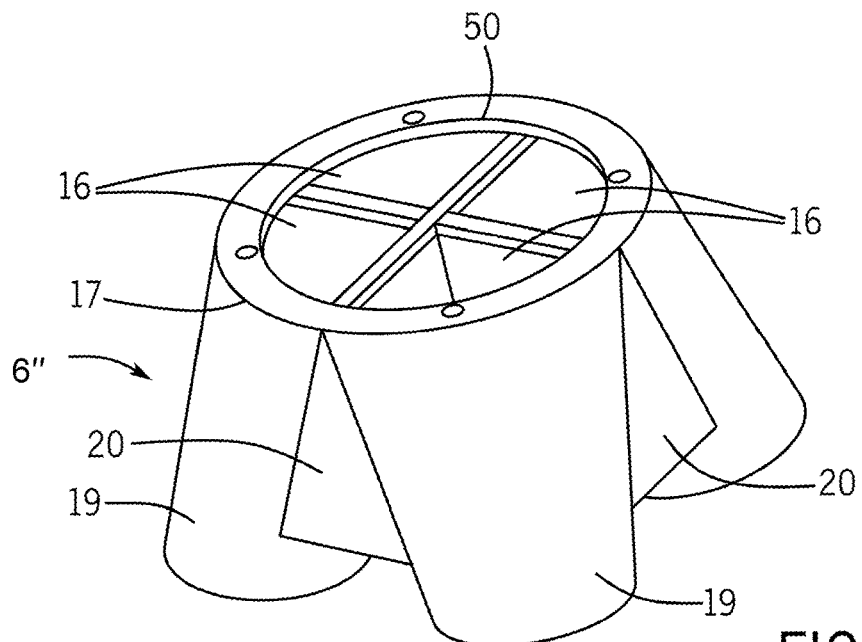
FIG. 8 is a perspective view of an example transition body with an example upper connection flange, shown from above.
Figure 9:
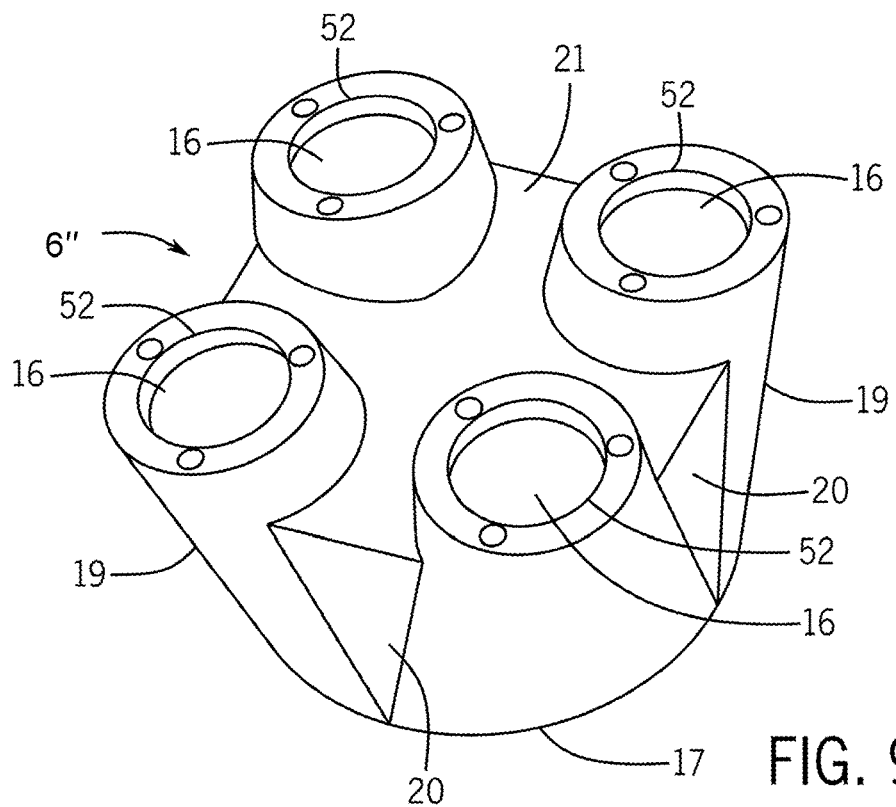
FIG. 9 is a perspective view of an example transition body with example lower connection flanges, shown from below.

FIG. 8 is a perspective view of an example transition body 6" having an example upper connection flange 50, as disclosed above but not shown in the figures. In addition, FIG. 9 shows the example transition body 6" with example lower connection flanges 52, as disclosed above but not shown in the figures.

What is claimed is:

1. A transition body positionable between an upper tower section and a lower tower section of a tower for a wind power station, the transition body comprising:
    an upper connection flange for connection to the upper tower section, the upper connection flange being substantially annular;
    at least three lower connection flanges that are substantially annular, with each lower connection flange configured for connection to a corner leg of the lower tower section; and
    a plurality of segments disposed about a central tower axis, wherein a quantity of the plurality of segments corresponds to a quantity of the corner legs of the lower tower section, each of the plurality of segments being configured as a hollow tube having a cross-sectional shape that changes along its tubular length from a circular cross-sectional shape defined at an open lower end of each segment, to a pie-slice cross-sectional shape defined at an opposing open upper end of each segment,
        wherein upper peripheral sections of the plurality of segments are configured as an annular circumferential connection envelope that supports the upper connection flange,
        wherein lower sections of the plurality of segments are configured as annular circumferential segment envelopes that support the lower connection flanges, and
        wherein inwardly pointing sections of the plurality of segments are disposed at acute angles with respect to one another and converge into one another at or near the upper connection flange.

2. The transition body of claim 1 wherein the plurality of segments are substantially similar in configuration.

3. The transition body of claim 1 wherein the inwardly pointing sections of the plurality of segments converge into one another such that a bottom of the transition body is closed off by the annular circumferential segment envelopes in a region through which the central tower axis passes.

4. The transition body of claim 1 wherein the inwardly pointing sections of the plurality of segments converge into one another such that transitions of the annular circumferential segment envelopes form a star-like structure.

5. The transition body of claim 1 wherein the upper peripheral sections of the plurality of segments configured as the annular circumferential connection envelope have a circle segment shape.

6. The transition body of claim 1 wherein cross-sections of the annular circumferential segment envelopes change steadily in an upper region of the transition body.

7. The transition body of claim 1 wherein the annular circumferential segment envelopes are tapered towards a bottom of the transition body.

8. The transition body of claim 1 wherein at least one of the upper connection flange or the lower connection flanges are circular in shape.

9. The transition body of claim 1 wherein the upper connection flange is arranged inside the annular circumferential connection envelope and/or the lower connection flanges are arranged inside the annular circumferential segment envelopes.

10. The transition body of claim 1 wherein the annular circumferential segment envelopes are formed by substantially lengthwise welded steel plates.

11. The transition body of claim 10 wherein the steel plates are at least one of triangular curved steel plates or trapezoidal curved steel plates.

12. The transition body of claim 1 further comprising at least one of the following:
    lateral connection plates for joining the annular circumferential segment envelopes; or
    a lower connection plate disposed substantially transversely to the central tower axis for joining the annular circumferential segment envelopes.

13. A tower for a wind power station, the tower comprising:
    an upper tower section configured as a tubular tower;
    a lower tower section comprising at least three corner legs; and
    a transition body coupled at an upper end to the upper tower section, and coupled at a lower end to the lower tower section, the transition body comprising:
        an upper connection flange connected to the upper tower section, the upper connection flange being substantially annular,
        at least three lower connection flanges that are substantially annular, with each lower connection flange connected to one of the corner legs of the lower tower section, and
        a plurality of segments each having respective upper and lower ends and being connected to the upper connection flange at their respective upper ends, and each being connected at their respective lower ends to different ones of the at least three lower connection flanges, the plurality of segments being disposed about a central tower axis, wherein a quantity of the plurality of segments corresponds to a quantity of the corner legs of the lower tower section, each of the plurality of segments being configured as a hollow tube having a cross-sectional shape that changes along its tubular length from a circular cross-sectional shape defined at an open lower end of each segment, to a pie-slice cross-sectional shape defined at an opposing open upper end of each segment,
            wherein upper peripheral sections of the plurality of segments are configured as an annular circumferential connection envelope that supports the upper connection flange,
            wherein lower sections of the plurality of segments are configured as annular circumferential segment envelopes that support the lower connection flanges, and
            wherein inwardly pointing sections of the plurality of segments are disposed at acute angles with respect to one another and converge into one another at or near the upper connection flange.

14. A transition body for transitioning a wind power station's lower tower section having a plurality of legs, into an upper tower section of the wind power station on which a wind turbine is mounted, the transition body comprising:

a plurality of support segments whose quantity corresponds to a quantity of the plurality of legs of the lower tower section, each support segment configured as a hollow tube having a cross-sectional shape that changes along its tubular length from a circular cross-sectional shape defined at an open lower end of each support segment, to a pie-slice cross-sectional shape defined at an opposing open upper end of each support segment, said pie-slice cross sectional shape including two straight edges that intersect, each of said support segments being rotationally disposed about a central tower axis such that, adjacently positioned support segments abut one another at inner regions of their upper ends such that said straight edges of respective adjacent support segments form straight line-shaped connection sites for each pair of adjacent support segments, thereby forming a star-shaped pattern with respect to said line-shaped connection sites, outer regions of said support segments align with each other at said upper ends such that said plurality of support segments collectively define at their upper ends a substantially annular connection envelope, and said support segments are disposed at acute angles with respect to one another and converge into one another at their respective upper ends;

an annular upper connection flange coupled to said annular connection envelope defined by said upper ends of said plurality of adjacent support segments, said upper connection flange configured to be coupled to the upper tower section of the wind power station;

a plurality of annular lower connection flanges, one each coupled to each of said lower ends of said plurality of support segments, each of said plurality of lower connection flanges configured to be coupled to a different one of the plurality of legs of the lower tower section.

* * * * *